United States Patent [19]
Seeley

[11] 3,843,811
[45] Oct. 22, 1974

[54] LOW FAT EGG PRODUCT
[75] Inventor: Robert D. Seeley, Crestwood, Mo.
[73] Assignee: Anheuser-Busch, Incorporated, St. Louis, Mo.
[22] Filed: Mar. 23, 1972
[21] Appl. No.: 237,563

[52] U.S. Cl. ............................... 426/211, 426/348
[51] Int. Cl. ............................................. A23l 1/32
[58] Field of Search ...... 99/113, 114; 426/149, 167, 426/196, 199, 201, 211, 215, 348, 384, 185, 176

[56] References Cited
UNITED STATES PATENTS
3,475,180  10/1969  Jones ................................. 99/113
3,565,638  2/1971  Ziegler, Jr. et al. ................. 99/113

Primary Examiner—A. Louis Monacell
Assistant Examiner—R. A. Yoncoskie
Attorney, Agent, or Firm—Gravely, Lieder & Woodruff

[57] ABSTRACT

A frozen egg product which contains reduced levels of fat and cholesterol comprising the specified properties of:
- A. about 4 percent to about 6 percent liquid whole egg,
- B. about 88.5 percent to about 92.5 percent liquid egg white,
- C. about 2 percent to about 2.6 percent potato flour,
- D. about 0.1 percent to about 0.2 percent carboxymethyl cellulose,
- E. about 1.4 percent to about 1.8 percent non-fat milk solids, and
- F. sufficient citric acid to provide a pH between about 6.8 and 7.9 in the mix,
- G. said mix containing about 0 to 1.1 percent fat, about 8 to 18 percent protein, and less than about 0.05 percent cholesterol.

1 Claim, No Drawings

LOW FAT EGG PRODUCT

BACKGROUND OF THE INVENTION

This invention relates to a new and improved egg product and a process for making same.

The edible portion of whole eggs contains approximately 25 percent egg solids and 75 percent water, 12 percent protein and 11 percent fat. When I use the term whole eggs, this is the product I mean. The contents of the shell egg are partitioned between egg white and egg yolk. Egg yolk makes up about 39 percent of the freshly cracked egg and contains approximately 45 percent solids, 14 percent protein and 30 percent fat. The yolk contains about 2 percent cholesterol. When I use the term egg yolk, this is the product I mean. The liquid egg white makes up about 61 percent of the whole egg and contains approximately 12 percent solids, 10 percent protein and only a trace of fat. There is no cholesterol in egg whites. When I use the term egg whites, this is the product meant. When I use the term egg white solids and egg yolk solids, I mean the actual solids on a dry basis. The relative amounts of egg white to egg yolk vary in eggs from different flocks, but the composition of egg white and egg yolk is more uniform.

In recent years it has been shown that in man there is a relationship between dietary cholesterol and circulatory disorders such as arteriosclerosis. It is also well known that there is a direct relationship between obesity and health. It is well recognized that eggs form an important part of the diet with over 70 billion eggs a year being consumed for table use. The quality of the protein of eggs is one of the highest in any natural food product, having a biological value of 100. It would be important in the treatment of patients with circulatory disorders and people who are over-weight to be able to include a liberal amount of egg or egg products in their daily diet as a source of high quality protein, but to provide this protein without accompanying it with the large percentage of fat, cholesterol and calories contained in the shell of frozen whole eggs or in other products containing a significant percentage of whole eggs.

Compositions of egg-based products have been formulated by others which contain high levels of egg white solids to whole egg solids or yolk solids. These products may contain other non-egg protein sources, natural gums and in some cases vegetable fats. The vegetable fats are added to improve palatability, but do not contain cholesterol. Many of these prior art products are formulated from dried egg products and on reconstitution and cooking, have very unsatisfactory eating qualities. The cooked product is usually mealy, having typical spray-dried off-egg flavors. Only dried eggs from freeze-dried whole eggs have satisfactory egg flavors and texture when reconstituted and cooked. However, freeze-dried egg solids are expensive. The usual combinations of high egg white solids and low yolk solids are prepared by using spray-dried egg solids. Spray drying produces the typical off-egg flavor and denatures the egg protein, so that on reconstitution and cooking, the typical texture and mouth feel of scrambled eggs or an egg omelet made from whole eggs is not developed.

Another problem in preparing low fat eggs is that when small amounts of egg yolk in the form of yolk or whole eggs are combined with large amounts of egg white the cooked egg is tough in texture or mealy especially after standing on a steam table, and has undesirable eating qualities. It is not known why this occurs, but it is assumed that in the egg composition composed of small amounts of egg yolks and large amounts of egg white, the egg white protein sets up too firm on cooking. There is a severe heat denaturization when the egg product is cooked.

If the percent of egg yolk in a mixture of egg yolk and egg white is above 8 percent the cooked egg has an acceptable eating quality. It may be that about 8 percent or more of egg yolk is necessary to get a emulsified egg mixture which will cook to a more desirable texture and not be too mealy.

In the Table I is shown the effect of decreasing the amount of egg yolk to egg white on eating quality. The source of egg yolk is liquid whole eggs. Only the egg product containing 25 percent liquid whole egg to 75 percent liquid egg white (Formula 5) had a texture which was at all edible. All these egg products are acidified to a pH of approximately 6.95 and cooked in a double boiler.

Table I

|  | Formula No. 1 % | Formula No. 2 % | Formula No. 3 % | Formula No. 4 % | Formula No. 5 % |
|---|---|---|---|---|---|
| Liquid Whole Egg | 5 | 10 | 15 | 20 | 25 |
| Liquid Egg White | 95 | 90 | 85 | 80 | 75 |
| Fat Reduction | 95 | 90 | 85 | 80 | 75 |
| Syneresis % | 8.8 | 7.4 | 8.5 | 8.2 | 8.6 |
| Texture | v. mealy* | v. mealy | v. mealy | v. mealy | mealy |

*very mealy

Syneresis which is determined by placing 100 gms of the cooked egg products on some glass wool in a funnel and measuring the amount of liquid which passes through the glass wool in 1 hour was an unacceptable 6.6 to 8.8 percent. The least amount of "weeping" (syneresis) occurred in the Formula No. 5 which also was the only product approaching an edible quality. This product contains 10 percent whole egg yolk and about 5 percent egg yolk solids. There still were certain deficiencies in the product in eating quality, as to mealiness and the amount of syneresis.

As will be explained in more detail hereinafter, I have discovered that a good tasting but low fat (and low cholesterol) egg product can be made containing less than about 8 percent egg yolk. This product uses non-egg ingredients in a composition similar to that in U.S. Pat. No. 3,565,638 issued to Ziegler, Seeley, and Holland and assigned to Anheuser-Busch, Incorporated, assignee of the present invention. The addition of the proper level of non-egg ingredients of U.S. Pat. No. 3,565,638 to mixtures of egg whites and egg yolks which contain only 20 percent to approximately 5 percent of the egg yolk solids of whole eggs will produce a good tasting low fat, low cholesterol cooked egg product.

SUMMARY OF THE INVENTION

This invention comprises a low fat frozen egg product which, when cooked, has all of the desirable taste characteristics of fresh whole eggs. The product comprises an egg mix containing 92 percent or more egg whites and 8 percent or less egg yolks and non-egg ingredients similar to those described in U.S. Pat. No. 3,565,638.

DETAILED DESCRIPTION

When fresh whole eggs are dehydrated in a recirculating plate evaporator, thin-film evaporators, rising and falling film evaporators, or any evaporator which will dehydrate eggs at a temperature below that which denatures the egg protein (about 140°F.), the whole eggs can be concentrated to solids levels of some 40–50 percent at low cost and with no injurious affect on the egg protein quality or the development of off flavors. By combining a small amount of the concentrated whole egg solids containing 40–50 percent solids with egg white which contains approximately 12 percent solids, egg products can be prepared with as little as 5 percent of the cholesterol and fat found in a whole egg product but with an eating quality after cooking inferior to a whole egg. When the final egg product contains egg solids with as little as 34 percent of the fat contained in regular whole egg solids, unconcentrated whole eggs can be used with egg whites in formulating a low fat-low cholesterol egg product but the eating quality of the cooked eggs are poor.

In U.S. Pat. No. 3,565,638 there is described a frozen egg mixture in which the addition of non-fat milk solids, (NFMS) potato flour, a vegetable gum, and an edible acid, lowered the pH and improved the stability of a cooked egg product against color changes, texture and syneresis. These non-egg ingredients in the egg products composed of whole eggs had the primary effect of improving steam table stability.

Egg product compositions containing 7 percent of the fat in whole egg solids prepared by blending liquid egg yolk with concentrated egg whites in the formula in Table II have tough texture immediately after being cooked.

TABLE II

| Formula | % | % Egg Solids | % Fat |
| --- | --- | --- | --- |
| Liquid egg yolk (44.5% solids) | 2.2 | 0.98 | 0.6 |
| Conc. Egg Whites (20.1% solids) | 97.8 | 19.6 | 0.0 |
|  | 100% | 20.6 | 0.6 |

After standing for one-half hour the cooked eggs were green and rubbery. The poor quality immediately after cooking probably resulted from the high concentration of egg white solids in the formula (approximately 20 percent) compared to 12 percent for unconcentrated liquid egg whites.

I have discovered that the non-egg ingredients in U.S. Pat. No. 3,565,638 added to a low yolk egg mixture improves the eating quality of the egg product immediately after cooking as well as improving steam table stability. These special added ingredients improve the eating quality in low-fat egg mixtures when combination of egg yolk solids to egg white solids are prepared using concentrated liquid whole eggs, unconcentrated liquid whole eggs, liquid egg yolks, liquid egg whites, concentrated liquid egg whites, freeze-dried egg yolks, whole eggs or egg whites. The special added ingredients also make possible an all egg white product of acceptable eating quality as is shown in Example XVI.

Improvement in the fresh cooked eating quality of low-fat egg mixtures occurs in egg solid concentrations of from approximately 12 percent to approximately 21 percent. At low egg solids levels the non-egg ingredients prevent an undesirable mealy texture. At high egg solids concentrations these ingredients prevent a tough, rubbery texture after cooking. The blend of non-fat milk solids, potato flour and vegetable gum is called a premix. A preferred formula for this premix is shown in Table III.

TABLE III

| | |
| --- | --- |
| Non-fat milk solids | 40.1% |
| Potato flour | 57.1% |
| Carboxymethyl cellulose | 2.8%  = 100.0% |

This invention describes a process and product for producing a low cholesterol, low fat, low calorie, high egg protein egg product which will, on cooking, have a typical wholesome egg flavor and egg texture equal to a normal whole egg product containing about 25 percent solids and about 11.0 percent fat. By weight, the final product can have approximately 0 to 5.0 percent egg yolk solids and 11.4 to 9.6 percent egg white solids. The water content can be 79 to 88 percent. From 1.0 to 2.5 percent non-fat milk solids, from 1 to 3.5 percent starch, from 0.1 to 0.2 percent vegetable gum is in the product, and from 0.05 to 0.15 percent citric acid may be used. The total solids can be from 12 to 21 percent.

The total protein is 8 to 18 percent, the fat is 0.0 to 2.2 percent, and the cholesterol 0.0 to 0.11 percent in the final product on a solids basis.

Following are specific examples of the present invention:

EXAMPLE I

Liquid whole egg concentrates containing 42 percent solids are blended with liquid egg whites which had been concentrated by freeze drying to about 20 percent solids. In Table IV the formulation is given. The composition contains 25.6 percent solids which is approximately equal to the egg solids of fresh whole eggs, but contains only 4.4 percent fat which is only 40 percent of the amount found in whole eggs. This egg composition contained about ⅓ more egg protein. This egg product when cooked had a good egg flavor but the texture was rough and rubbery. The poor texture probably resulted from the high concentration of egg whites solids with insufficient water in the formula to satisfy the normal water holding capacity of egg white solids. The high pH may have affected adversely the cooked texture.

TABLE IV

| | % Solids | Parts | Lbs. Solids | pH | % Fat | % Protein |
| --- | --- | --- | --- | --- | --- | --- |
| Whole Egg Conc. | 42% | 24 | 10.1 | 8.3 | 4.4 | 4.4 |
| Egg White Conc. | 19.9% | 76 | 15.1 | 9.0 | — | 12.1 |
| Total | | 100 | | | 4.4 | 16.5 |

Total Solids 25.6%

EXAMPLE II

The egg composition in Table IV which had a tough texture on cooking had a pH above 8.3. In Table V are the results of lowering the pH of egg whites from a pH 9.0 to 5.5. Lowering of the pH does not improve the cooked texture and at a pH of 5.5 the cooking consistency and flavor for egg whites is unsatisfactory. These data demonstrate that the pH of egg compositions containing a high percentage of egg whites must have a pH well above 5.5 preferably above about 6.9 to have satisfactory cooking consistency. The more tender cooked consistency of the egg whites in this Example compared to the egg product in Example I may have resulted from the lower egg solid concentration of 12 percent for liquid egg whites.

10 percent concentrated whole eggs (43 percent solids) and 80 percent of liquid whites (12 percent solids) were substituted for the normal amount of unconcentrated whole eggs used in this egg product. Water (no water in Formula No. 2), a premix composed of carboxymethyl cellulose, potato flour, non-fat milk solids, a coloring agent and citric acid made up the balance of the formula. The egg solids were approximately 14 percent of Formula No. 1 and the total solids was approximately 17 percent. In Formula No. 2 no additional water was used. Product No. 2 contained a higher percentage of egg solids and total solids.

These egg compositions in Table VI contain about 16–17 percent of the fat compared to the fat content of the same products made with 90–96 percent whole eggs. The eating quality of the cooked egg products were excellent.

TABLE V

| Sample No. | pH of Whites | Cooked Consistency | Flavor |
|---|---|---|---|
| 1 (Control) | 9.0 | Tender | Good |
| 2 | 7.9 | Satisfactory | Good |
| 3 | 6.9 | Somewhat Mealy | Fair |
| 4 | 5.5 | Very Grainy | Acidic-Bland no egg white aroma or taste. |

TABLE VI

| | FORMULA No. 1 | | | FORMULA No. 2 | | |
|---|---|---|---|---|---|---|
| | % | % Egg Solids | % Egg Fat | % | % Egg Solids | % Egg Fat |
| Whole Egg Conc. (43% Solids) | 10.000 | 4.3 | 1.8 | 10.000 | 4.30 | 1.8 |
| Liquid Whites (12.0% Solids) | 80.000 | 9.6 | — | 86.350 | 10.36 | — |
| | | 13.9 | 1.8 | | 14.66 | 1.8 |
| Water | 6.350 | | | No Water | | |
| Premix | 3.500 | | | 3.500 | | |
| Color Solution | 0.027 | | | 0.027 | | |
| Citric Acid Sol. (50%) | 0.123 | | | 0.123 | | |
| | 100.00 | | | 100.00 | | |

| PREMIX FORMULA | |
|---|---|
| Potato Flour | 57.1 |
| Non-Fat Milk Solids | 40.1 |
| Carboxymethyl cellulose | 2.8 |
| | 100.0 |

EXAMPLe III

A liquid egg product low in fat and cholesterol and containing only egg derived solids (low yolk solids-high egg white solids) has to be cooked carefully to prevent developing a tough cooked egg product. However, the same type of ingredients which produce the excellent stability of the frozen egg mixture reported in U.S. Pat. No. 3,565,638, improves the eating quality of egg products high in egg white immediately after cooking and after being held under steam table conditions. In Table VI are shown compositions No. 1 and No. 2 in which

EXAMPLE IV

In Table VII are shown Formulations 1, 2, 3 and 4 in which the egg product of Formulas 1, 2 and 3 have a 78, 89 and 51 percent reduction respectively in fat compared to a whole egg product shown in Formula No. 4. On cooking, all four formulas were comparable in flavor and texture. The lower pH of 6.8 and the presence of potato flour, non-fat milk solids and CMC improved the cooked flavor and texture of the low fat egg product.

To attain the high reductions in fat in the egg product in Table VII, egg whites with a normal solids content of 12 percent were concentrated under reduced pressure at temperatures under 140°F. to increase the egg solids concentration to 20 percent.

TABLE VII

FORMULATIONS

|  | No. 1 | Egg Solids | No. 2 | Egg Solids | No. 3 | Egg Solids | No. 4 | |
|---|---|---|---|---|---|---|---|---|
| Whole Egg Concentrate (43% Solids) | 10% | 4.3 | 5% | 2.15 | 23% | 9.89 | | |
| Egg White (20% Solids) | 80% | 16.0 | 91.35% | 18.27 | 54% | 10.8 | | |
|  | 90% | 20.3% | 96.35% | 20.43% | 77% | 20.68 | | |
| Unconc. Whole Egg | | | | | | | 77% | |
| Water | 6.35 | | None | | 19.35% | | 19.35 | |
| Premix* | 3.50% | | 3.50% | | 3.50% | | 3.5 | |
| Color Sol. | 0.027% | (Min.) | 0.027% | (Min.) | 0.027% | (Min.) | 0.027 | (Min.) |
| Citric Acid Sol. (50%) | 0.122% | do. | 0.122% | do. | 0.122% | do. | 0.122 | (Min.) |
| pH | | 6.8 | 6.8 | | 6.8 | | 6.8 | |

* Formula in Table III

EXAMPLE V

A low fat egg product is prepared by mixing egg yolk (approximately 45 percent solids) and egg whites (approximately 12.4 percent solids) in the proportions as shown in Table VIII. All batches were adjusted to pH 6.8 with citric acid and color added. In all three formulas the reduction in egg fat was approximately 90 percent. The replacement of egg yolk with egg white lowered the total egg solids almost 50 percent, but the egg protein of the low-fat egg products were about 83 percent of the protein content of an equivalent amount of whole eggs.

The egg formula No. 2 containing only egg yolk and egg white had an unsatisfactory mealy texture after frying and had appreciable syneresis shortly after cooking. The addition of extra water (Formula No. 1) did not improve the cooked eggs. The addition of 3.5 percent premix in Formula No. 3 eliminated the mealy texture and prevented syneresis of the cooked egg product. It is not known why the low yolk-high white egg product has a mealy texture, but it is known that egg yolk contains fats and emulsifying agents (phospholipids) which give a non-mealy cooked egg. The premix, containing potato flour, non-fat milk solids, and carboxymethyl cellulose, apparently replace the functional value of egg yolk without adding fat to the product.

TABLE VIII

|  | Formula No. 1 % | Formula No. 2 % | Formula No. 3 % | Whole Eggs |
|---|---|---|---|---|
| Egg Yolk | 4.26 | 4.42 | 4.26 | |
| Egg White | 92.24 | 95.58 | 92.24 | |
| Premix | — | — | 3.50 | |
| Water Added | 3.5 | — | — | |
|  | 100.0 | 100.0 | 100.0 | |
| Egg Solids | 13.4 | 13.8 | 13.4 | 25 |
| Egg Fat | 1.2 | 1.2 | 1.2 | 11.5 |
| Egg Protein | 10.7 | 11.1 | 10.7 | 12.9 |
| Flavor | Bland | Bland | Bland | |
| Texture | Wet, mealy | Slightly wet, mealy | Good | |
| Syneresis | Positive | Positive | Slight | |

EXAMPLE VI

Satisfactory cooked egg products from 85 to 95 percent of the egg fat removed were made containing about 3.5 percent of the premix set out in Table III. The premix contained non-fat milk solids, potato flour, and carboxymethyl cellulose.

In Table IX are the formulas for three low fat egg products. After blending the ingredients and adjusting the pH to 6.8, the products were fried and taste tested.

TABLE IX

|  | Formula No. 1 % | Formula No. 2 % | Formula No. 3 % |
|---|---|---|---|
| Egg Yolk | 2.05 (6.15 gm) | 4.10 (12.3 gm) | 6.15 (18.5 gm) |
| Egg White | 94.45 (283.4 gm) | 92.40 (277.0 gm) | 90.35 (271.0 gm) |
| Premix | 3.50 (10.5 gm) | 3.50 (10.5 gm) | 3.50 (10.5 gm) |

TABLE IX – CONTINUED

|  | Formula No. 1 % | Formula No. 2 % | Formula No. 3 % |
|---|---|---|---|
| Egg Fat | 0.55 | 1.15 | 1.65 |
| Texture |  |  |  |
| (soft fry) | sl. mealy | sl. mealy | sl. mealy |
| (firm fry) | good | good | good |
| Flavor | good | good | good+ |

All products were essentially equal in eating quality. The flavor of the egg product in Formula No. 3 had slightly eggier flavor. An egg product with the same egg fat concentration as in Formula No. 2 derived from 2.5 percent of a 42 percent whole egg concentrate and 94 percent egg whites and 3.5 percent premix had the same cooked eating quality as products formulated from egg yolks and egg whites.

Low fat egg compositions containing only 20 to 5 percent of the fat in an equivalent amount of whole egg and whose solids content is at least about 80 percent egg derived solids, can be made by blending varying proportions of concentrated whole eggs and egg whites, concentrated whole eggs and concentrated egg whites, egg yolk and egg whites and whole eggs and egg whites. In Example VII are formulas of compositions of whole eggs and egg whites with the premix.

white with no other additive are very mealy in texture and unacceptable in eating quality. The addition of 3.5 percent premix improves the texture and lowers syneresis. Only the egg combination in Formula No. 1 — Table X was very mealy. Any egg product with a ratio of 80 percent or more egg whites to 20 percent or less whole eggs must contain additions of the type in the premix to make a satisfactory low-fat cooked egg product. The compositions in Table X containing the premix, when pan fried, did not have a mealy texture except slight mealiness in formulas with a 95 percent fat reduction. When similar low fat products without premix were pan fried they had an unacceptable mealy texture. When the low fat egg products were cooked in a double boiler, the cooked eggs had a mealier texture than when pan fried.

Table X

|  | Formula No. 1 % | Formula No. 2 % | Formula No. 3 % | Formula No. 4 % | Formula No. 5 % |
|---|---|---|---|---|---|
| Liquid Whole Egg | 5.0 | 10.0 | 15.0 | 20.0 | 25.0 |
| Liquid Egg Whites | 91.5 | 86.5 | 81.5 | 76.5 | 71.5 |
| Premix | 3.5 | 3.5 | 3.5 | 3.5 | 3.5 |
| Total | 100.0 | 100.0 | 100.0 | 100.0 | 100.0 |
| Color Added | 0.03 | 0.03 | 0.02 | 0.02 | 0.02 |
| 50% Citric Acid | 0.39 | 0.34 | 0.30 | 0.28 | 0.26 |
| pH before adjust. | 9.05 | 8.95 | 8.65 | 8.55 | 8.40 |
| Fat Reduction | 95 | 90 | 85 | 80 | 75 |
| Syneresis | 4.70 | 4.57 | 3.97 | 3.65 | 2.76 |
| Texture | very mealy | mealy | mealy | sl. mealy | very sl. mealy |
| Taste | bland | bland | bland | bland | bland |

EXAMPLE VII

Liquid whole eggs and liquid egg whites were blended in varying proportions as shown in Table X. Egg products containing 80 percent or more of egg Acidification with citric acid of low fat egg products prevents greening as shown in Table XI. Other organic acids, inorganic acids or acidic salts can be used to lower the pH of low-fat egg compositions. Such acids include adipic acid, fumaric acid, hydrochloric and acetic acid. An example of an acidic salt would be sodium acid phosphate.

TABLE XI

|  | Egg Product with 90% Fat Reduction* | | Egg Product with 80% Fat* Reduction | |
|---|---|---|---|---|
|  | Acidified pH 6.85 | No Acidification pH 8.85 | Acidified pH 6.85 | No Acidification pH 8.6 |
| 1st hr. on steam table | No Greening | V.S. Greening | No Greening | S. Greening |
| 2nd Hr. on Steam table | No Greening | Sl. Greening | No Greening | Green |

*Contains 3.5% premix.

Increasing the level of premix in a low fat egg product improves the eating quality of the fried egg product. The exact level is dependent on the quality of the cracked egg. In Table XII, Example VII-A are shown the eating quality of cooked low fat egg products containing 10 percent whole egg and 85 to 90 percent liquid egg white and varying levels of premix.

EXAMPLE VII-A

Five hundred gm. batches of egg product were prepared to which 0.15 ml. of coloring solution and 1.6 ml. of 50 percent citric acid were added. After blending, 150 gms. were cooked in a frying pan for 2½ min. The results are shown in Table XII.

2.9 percent carboxymethyl cellulose. Based on the entire mixtures, the levels of potato flour were from 0.6 to 4.3 percent, of non-fat milk solids from 0.4 to 3.0 percent and of carboxymethyl cellulose from 0.03 to 0.2 percent. In Table XIII are shown the optimal levels of premix of from 3.5 to 4.5 percent when cooked in a double boiler. Lower levels than 3.5 percent could be used and higher levels of premix up to 5.5 percent if the product were fried. Low levels of the premix tend to make the product too wet and mealy. High levels of premix make the cooked egg dry and mushy.

TABLE XIII

| Ingredients | No. 1 | No. 2 | No. 3 | No. 4 | No. 5 | No. 6 | No. 7 | No. 8 | No. 9 |
|---|---|---|---|---|---|---|---|---|---|
| Liq. Whole Egg | 5.0 | 5.0 | 5.0 | 5.0 | 5.0 | 5.0 | 5.0 | 5.0 | 5.0 |
| Liq. Egg White | 95.0 | 94.0 | 93.0 | 92.0 | 91.5 | 90.5 | 89.5 | 88.5 | 87.5 |
| Premix | 0 | 1.0 | 2.0 | 3.0 | 3.5 | 4.5 | 5.5 | 6.5 | 7.5 |
| Viscosity, cps | 8 | 15 | 25 | 75 | 75 | 110 | 235 | 825 | 1650 |
| Syneresis % | 6.1 | 6.2 | 5.1 | 4.5 | 3.4 | 3.5 | 2.9 | 1.7 | 1.2 |
| Cooked Egg Quality | v.w. w.me. | v.w. v.me. | w. v.me. | w. v.me. | sl.w. me. | sl.w. sl.me. sl.mu. | sl.me. mu. | d. sl.me. mu. | d. sl.me. mu. |

```
v.w.   = very wet           mu.  = mushy
v.me.  = very mealy         me.  = mealy
v. mu. = very mushy         w.   = wet
sl. w. = slightly wet       d.   = dry
sl. me. = slightly mealy
sl. mu. = slightly mushy
```

As used in this Example and elsewhere in the application, the term "mealy" describes a mouth feel in which the cooked eggs when pressed against the palate, are lumpy and break apart. The term "mushy" describes an egg which compresses or flattens out when pressed against the palate. This is similar to the action of mashed potato when pressed. The loss of emulsifying action of substances in egg yolk probably causes the mealiness.

In Example IX are the results of the improvement in cooked eating quality of low-fat egg products to which lecithin has been added.

TABLE XII

| | Formula No. 1 % | Formula No. 2 % | Formula No. 3 % | Formula No. 4 % | Formula No. 5 % |
|---|---|---|---|---|---|
| Liquid Whole Egg | 10 | 10 | 10 | 10 | 10 |
| Liquid Egg White | 90 | 86.5 | 86 | 85.5 | 85 |
| Premix | — | 3.5 | 4.0 | 4.5 | 5.0 |
| Syneresis | 9.3 | 3.3 | 2.2 | 1.7 | 1.1 |
| Eating Quality | Wet,V.mealy | Sl. wet, Sl. mealy | Normal, Tender | Normal, Tender | Sl. dry, Tender to firm |

The low fat formulations using the premix when cooked in moist heat as in a double boiler tend to be more mealy as the ratio of liquid egg whites to egg yolk goes from 80 percent egg whites and 20 percent egg yolk, to 95 percent egg white to 5 percent egg yolk. In Example VIII are the results of the addition of varying levels of premix to low-fat egg formulations containing only 5 percent of the egg fat of an equivalent amount of whole egg.

EXAMPLE VIII

To mixtures of 5 percent liquid whole eggs and 87.5 to 95.0 liquid egg whites was added levels of premix from 0 to 7.5 percent. The premix contained 57.1 percent potato flour, 40 percent non-fat milk solids and

EXAMPLE IX

Five hundred gm. batches of low-fat egg products of the basic formula of 10 percent whole eggs, 86.5 percent liquid whites and 3.5 percent premix were prepared. To two batches were added 0.3 percent and 0.5 percent by weight lecithin. The cooked eggs containing the 0.5 percent lecithin were not as mealy as control samples.

The low calorie egg products containing 20 percent or less whole egg and the premix in Table III, when adjusted to a pH of 6.95 with citric acid, retain the excellent eating quality after freezing as shown in the following Examples X and XIV:

EXAMPLE X

Five hundred gm. batches of liquid whole egg-egg white mixtures were prepared containing 5 to 20 percent whole egg and 3.5 percent premix and frozen. After 2 weeks the egg products were thawed and cooked and had excellent eating quality and a low level of syneresis.

mogenization, the egg product was packed in 1 gallon milk-type cartons and quickly frozen.

On thawing the low-fat-low cholesterol egg product when fried had a good egg texture, not mealy and had a good egg flavor. When cooked in a double boiler the cooked eggs had some mealy texture and a syneresis value of 4.8 percent.

The addition of starchy material, such as potato flour, non-fat milk solids, a vegetable gum of the carboxymethyl cellulose type, and citric acid all have special functions to give a good cooked eating quality to low-fat egg products. Egg products are usually classified as food products containing a minimum of 75 percent egg derived solids. Non-fat milk solids improves the cooked eating quality of a low-fat egg product. Potato flour improves eating quality and minimizes syn-

TABLE XIV

|  | No. 1<br>5% Whole Egg | No. 2<br>10% Whole Egg | No. 3<br>15% Whole Egg | No. 4<br>20% Whole Egg |
|---|---|---|---|---|
| Eating Quality after Frying | v. sl. mealy | v. sl. mealy | not mealy, tender | not mealy, tender |
| Syneresis % | 3.9 | 3.5 | 2.8 | 2.9 |

EXAMPLE XI

A 450 lb. batch of a low-fat, low cholesterol egg product containing less than 5 percent of the fat and cholesterol of an equivalent amount of whole eggs was prepared as follows. Liquid egg whites were milled and 407 lb. 9½ oz. were pumped from the hold tank to the egg churn. To the egg whites was added 22 lb. 8 oz. of whole eggs and the mix was agitated. Under agitation 1 lb. 12 oz. of a 50 percent solution of citric acid solution was added to bring the pH to 6.95. To the mix was added 2½ oz. of a U.S. Certified food color solution. With the agitators running 18 lb. of preblended premix was added. The premix contained 57.1 percent potato flour, 40 percent non-fat milk solids and 2.9 percent carboxymethyl cellulose. After a minimum of 15 minutes the mix was pumped from the churn to a hold tank and a final pH adjustment to 6.95 was made with the citric acid solution.

eresis. The addition of CMC increases viscosity of low-fat egg products. The citric acid lowers the pH of low fat egg products from around pH 8.69 to a pH minimum of 6.8 which prevents off-color development on standing. In example XII are shown formulas with either potato flour, NFMS or CMC removed. These formulas show some of the functions of the non-egg ingredients in the premix of Table III.

EXAMPLE XII

Egg compositions containing 5 percent liquid whole eggs and 90.5 percent liquid egg whites were prepared containing the various levels of potato flour, non-fat milk solids and carboxymethyl cellulose shown in Table XV. The viscosity, syneresis and cooked eating quality varied depending on the presence of each of the non-egg ingredients in the formula.

TABLE XV

| Ingredients | No. 1 % | No. 2 % | No. 3 % | No. 4 % |
|---|---|---|---|---|
| Liquid Whole Egg | 5.00 | 5.00 | 5.00 | 5.00 |
| Liquid Egg Whites | 90.50 | 90.50 | 90.50 | 90.50 |
| Potato Flour | 2.57 | — | 4.37 | 2.70 |
| N.F.M.S. | 1.80 | 4.37 | — | 1.80 |
| CMC | 0.13 | 0.13 | 0.13 | — |
| Viscosity, cps | 200 | 100 | 325 | 50 |
| Syneresis % | 2.5 | 5.0 | 1.6 | 2.2 |
| Cooked Quality | sl. mealy sl. mushy | sl. mealy not mushy | v. mealy v. mushy | sl. mealy sl. mushy |

The product was pumped through a plate heat exchanger to pasteurize the product for 3½ minutes at 145°F. and then homogenized at 2,000 psi. After ho- The potato flour minimizes syneresis without affecting flavor. The NFMS prevents the mushy texture of the cooked egg. The CMC increases the viscosity in the liquid egg product before cooking. All three non-egg ingredients in the approximate ratio of 57 percent potato flour, 40% NFMS and 3% CMC in a premix at levels of 3.5 to 4.5 percent improve the cooked eating quality of mixtures of liquid egg whites and liquid egg yolks in which the egg yolk is only 20 percent or less of the amount of egg yolk in an equivalent amount of liquid whole eggs. The inclusion of NFMS, potato flour, CMC and citric acid in low fat egg omelet formulations will produce excellent cooked omelets as shown in Examples XIII and XIV.

EXAMPLE XIII

In copending patent application Ser. No. 80,125 by Seeley and Latham, an egg omelet formulation is described which can be precooked, frozen and on reheating would have a flavor and texture comparable to a freshly prepared omelet of the same formula, or an omelet composed of fresh whole eggs. In Table XVI is shown the formula for this omelet mixture which contains 81.7 percent whole eggs. The low fat omelet containing 22.64 percent concentrated whole egg solids of 43 percent solids and 63 percent of egg whites containing 12 percent solids is also shown in Table XVI. The low fat omelet mixture contained only 4.2 percent fat compared to 9.0 percent fat in the whole egg omelet mix. When these two omelet mixtures were fried in the omelet making machine described in copending patent application Ser. No. 79,922 (of Seeley and Latham) the low fat formula was comparable to the whole egg formula in volume, flavor and texture.

EXAMPLE XIV

Using the same non-egg ingredients as in Example III, egg omelet formulations were made using proportions of liquid whole eggs and liquid egg whites which lowered the egg fat content of the formula (Table XVII) by an amount of 85 to 95 percent. When these low-fat formulations were cooked in the omelet making machine, omelets of good edibility were produced.

TABLE XVI

|  | Whole Egg Omelet Formulation % | Whole Egg-Egg white Low-Fat Omelet Formulation % |
|---|---|---|
| Whole Egg | 81.70 | — |
| Concentrated Whole Egg 43% Solids | — | 22.64 |
| Egg Whites 12% Solids | — | 63.40 |
| Water | 15.15 | 8.90 |
| Potato Flour | 1.60 | 1.50 |
| Non-fat Milk Solids N.F.M.S. | 1.12 | 1.06 |
| Citric Acid | 0.05 | 0.05 |
| Carboxymethyl cellulose | 0.08 | 0.07 |
| Klucel LF | 0.15 | 0.15 |
| Methocel MG 15,000 | 0.10 | 0.09 |
| Ethoxylated Monoglyceride | 0.05 | 0.05 |
| Sodium Bicarbonate | 0.75 | 0.71 |
| Sodium Aluminum Phosphate | 0.75 | 0.71 |
| Salt | 0.65 | 0.65 |
| Pepper | 0.06 | 0.05 |
|  | 100.00% | 100.00% |

TABLE XVII

|  | Whole Egg Omelet Formulation % | Whole Egg-Egg White Low-Fat Omelet Formulation | | |
|---|---|---|---|---|
|  |  | % | % | % |
| Whole Egg | 81.70 | 12.3 | 8.2 | 4.1 |
| Egg Whites 12% Solids | — | 69.4 | 73.5 | 77.6 |
| Water | 15.15 | 15.15 | 15.15 | 15.15 |
| Potato Flour | 1.60 | 1.50 |  |  |
| Non-Fat Milk Solids N.F.M.S. | 1.12 | 1.06 |  |  |
| Citric Acid | 0.05 | 0.05 |  |  |
| Carboxymethyl Cellulose | 0.08 | 0.07 |  |  |
| Klucel LF | 0.15 | 0.15 |  |  |
| Methocel MG 15,000 | 0.10 | 0.09 |  |  |
| Ethoxylated Monoglyceride | 0.05 | 0.06 |  |  |
| Sodium Bicarbonate | 0.75 | 0.71 |  |  |
| Sodium Aluminum Phosphate | 0.75 | 0.71 |  |  |
| Salt | 0.65 | 0.65 |  |  |
| Pepper | 0.06 | 0.05 |  |  |
|  | 100.00% | 101.9% |  |  |

(Formula does not add up to 100%)

The nutritive values of the low-fat egg products are shown in Table XVIII. The data was calculated using the values reported in the U.S.D.A. Handbook No. 8, Composition of Foods based on a 25 percent solids whole egg. The low-fat egg product contained only 35 percent of the calories and about 6 percent of the cholesterol of whole egg but contained 76 percent of the egg protein.

TABLE XVIII

NUTRITIVE VALUES

|  | Whole Egg gm/100 gms. | Low-Fat Egg Products* gm/100gms. |
|---|---|---|
| Total Protein | 12.0 | 9.1 |
| Fat | 11.0 | 0.6 |
| Cholesterol | 555 mg. | 34 mg. |
| Calories | 155 | 54 |

*Contains whole egg 5%, liquid whites 90.6%, potato flour 2.3%, N.F.M.S. 1.6% and C.M.C. 0.10%.

The low-fat egg product in Table XVIII provided 76% of the protein of an equivalent amount of whole eggs. The value of such a low-fat egg product is the low-fat, low cholesterol, and low calorie content in a product containing the best protein source for man, egg protein. In Table XIX the nutritive values of the low-fat egg product are compared when the amount of low-fat egg product (120 gms) provides the same quality of protein as two medium whole eggs. The 122 gm. portion of low calorie egg product

TABLE XIX

|  | Liquid Whole Eggs 90 gms Equivalent to 2 Medium Eggs gms. | Low Calorie Egg Product — 122 gms. gms. |
|---|---|---|
| Protein | 10.9 | 10.9 |
| Cholesterol | 0.500 | 0.041 |
| Fat | 9.8 | 0.73 |
| Calories | 140 | 65 | provides the same quantity of protein as 90 gms. of liquid whole eggs, but only 8.0 percent of the cholesterol, 7 percent of the fat and 46 percent of the calories.

Although the foregoing low-fat, low cholesterol egg products are prepared from liquid whole eggs and liquid egg whites, similar products can be prepared from freeze-dried or spray dried whole eggs or with freeze-dried or spray dried egg whites. In Example XV are shown formulations with dried whole eggs.

EXAMPLE XV

Whole eggs were freeze-dried and spray dried and reconstituted with water to 50 percent egg solutions and used in the formulations in Table XX. The spray dried whole egg gave formulations No. 2 and No. 4 an undesirable dry egg flavor.

TABLE XX

|  | No. 1 % | No. 2 % | No. 3 % | No. 4 % |
|---|---|---|---|---|
| Freeze-Dried Whole Egg | 2.5 |  | 5.0 |  |
| Spray Dried Whole Egg |  | 2.5 |  | 5.0 |
| Liquid Egg White | 93.8 | 93.8 | 91.3 | 91.3 |
| Premix | 3.5 | 3.5 | 3.5 | 3.5 |
| Citric Acid Sol. and color | 0.2 | 0.2 | 0.2 | 0.2 |

Samples No. 2 and No. 4 had a dry egg flavor after cooking
Samples No. 1 and No. 3 had good flavor The reported values for cholesterol in the literature vary depending on the source of eggs and the methods of analysis. In Table XXI are shown the cholesterol values on a lot of liquid whole eggs and for a low-fat, low cholesterol egg product with the formula shown in Table X, formula No. 1. The low-fat egg product contained

TABLE XXI

|  | Cholesterol % |
|---|---|
| Whole Egg Solids | 2.27 |
| Liquid Whole Egg | 0.57 |
| Yolk Solids | 3.24 |
| Liquid Yolk | 1.46 |
| Low-Fat Egg Product | 0.034 |
| Liquid Egg White | 0.0 | only about 5 percent of the fat and cholesterol of liquid whole eggs. The cholesterol values in Table XXI for other egg solids, yolk solids and liquid yolk were calculated from the and value determined on liquid whole egg and recorded in Table XXI. The maximum amount of cholesterol contemplated in this product is about 0.11 percent.

Variations of the basic low-fat egg products can be made by using a variety of vegetable gums such as guar, carrogeenan and otehr starches with the water-holding properties of potato flour, but potato flour ane CMC are preferred. The mixture can be flavored with cheese, textured protein bacon products, and other ingredients but all formulation would be within the scope of the patent.

EXAMPLE XVI

Five hundred gram batches of liquid eggs and premix were prepared according to the formulas in Table XXII. In formula No. 1, which was composed of 5 percent liquid whole egg and 91 percent liquid egg whites, the pH was adjusted to 7.0 with a citric acid solution. In formula No. 2, the same proportions of egg white to egg yolk were used but there was no pH adjustment. In formula No. 3 only liquid egg whites were used and there was no pH adjustment. The pH of the liquid egg whites was 9.0. The addition of the premix buffers liquid eggs to cause a decrease in pH.

TABLE XXII

|  | No. 1 | No. 2 | No. 3 |
|---|---|---|---|
| Liquid Whole Egg | 5% | 5% | — |
| Liquid Whites | 91% | 91% | 96 |
| Premix | 4% | 4% | 4 |
| pH | 7.0 | 8.3 | 8.4 |
| Fried Eating | firm texture | firm | firm |

TABLE XXII - CONTINUED

|  | No. 1 | No. 2 | No. 3 |
|---|---|---|---|
| Quality | bland flavor sl. mealy | tender, moist not mealy bland flavor | tender, moist not mealy very bland |
| Double Boiler Eating Quality | sl. wet mealy | mealy | v. mealy |
| Syneresis | 4.47% | 2.96% | 2.78% |
| Steam Table-2Hr. | no greening | v. sl. greening | no greening |

Liquid egg whites very in pH from about 8.8 to 9.2. With high levels of egg white of from 95 to 100 percent in egg products with the premix, the pH is approximately 8.3 to 8.4. Lowering the pH to 7.0 firms up the fried egg product with 5 percent egg yolk. At the pH of the mixture, pH 8.3, the fried egg product is not mealy and more tender and moist. The 100 percent egg white product at the pH of 8.4 with 4 percent premix is similar in eating quality. These data demonstrate that egg products composed of from 0-20 percent liquid whole eggs and 80-100 percent liquid egg whites have better eating qualities at the unadjusted higher pH's when fried. If double boiler cooked, the 100 percent egg white product is very mealy probably due to the selective devaluation of the egg white protein as the temperature of the egg mixture rises when cooked in a double boiler.

Slight greening does occur after 2 hours at a pH of 8.3 when 5 percent whole egg is in the product. The preferred pH of egg mixtures with 0-20 percent whole eggs will depend on the level of whole egg present. As the level of whole egg decreases, the amount of pH adjustment (lowering) required decreases. At 100 percent liquid egg white, no pH adjustment is required. The higher the pH of egg products with high levels of egg whites, the better the fried eating quality.

What I claim is:

1. A low-fat, low cholesterol frozen egg mix comprising by weight
   A. about 4 percent to about 6 percent liquid whole egg,
   B. about 92.5 percent to about 88.5 percent liquid egg white,
   C. about 2 percent to about 2.6 percent potato flour,
   D. about 0.1 percent to about 0.2 percent carboxymethyl cellulose,
   E. about 1.4 percent to about 1.8 percent non-fat milk solids, and
   F. sufficient citric acid to provide a pH between about 6.8 and about 7.9 in the mix,
   G. said mix containing about 0 to 1.1 percent fat, about 8 to 18 percent protein, and less than about 0.05 percent cholesterol.

* * * * *